Dec. 25, 1928.
C. E. F. AHLM
1,696,179
GEAR AND CLUTCH MECHANISM
Original Filed March 14, 1925
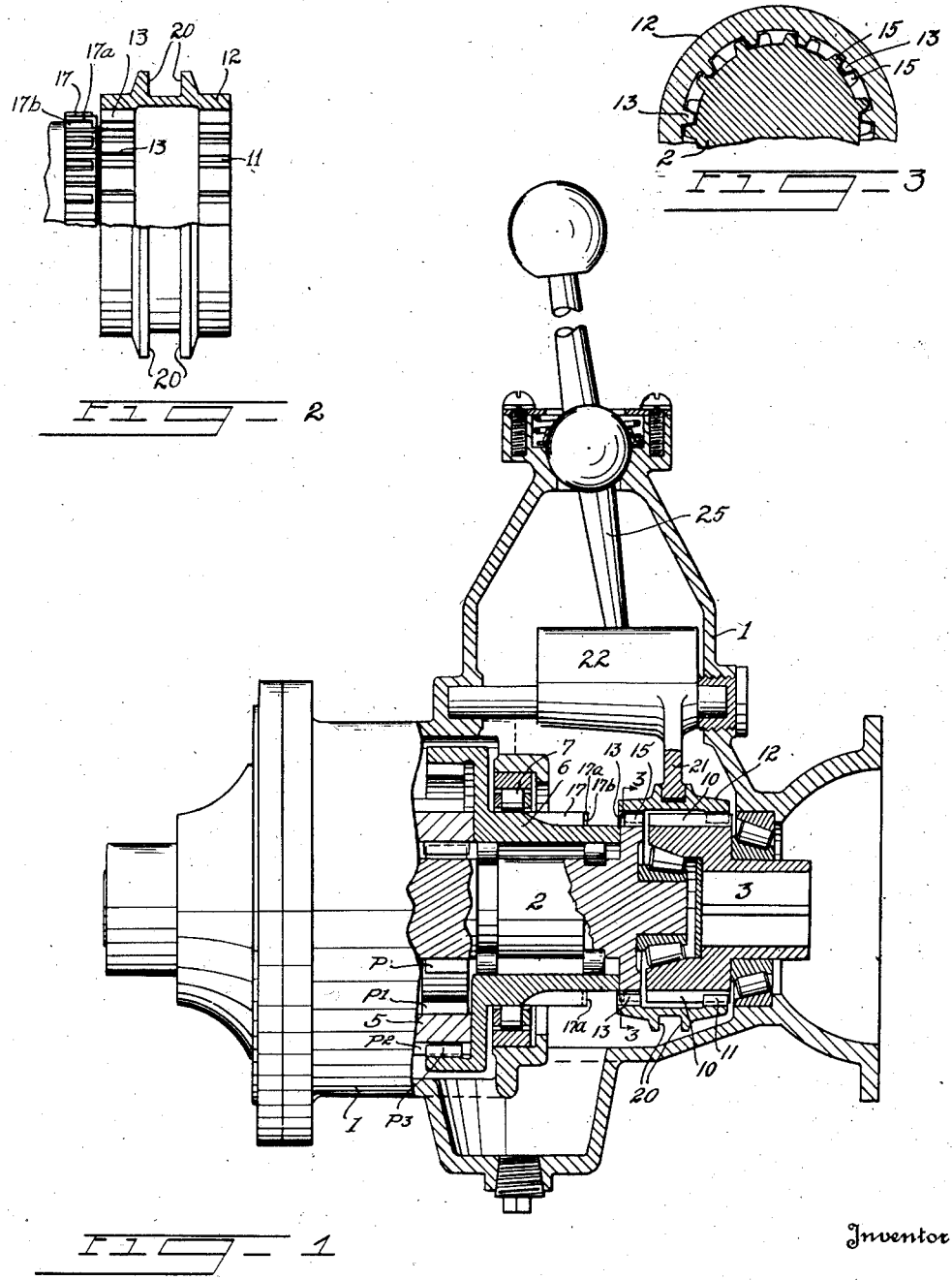
Inventor
Charles E. F. Ahlm
By Bates Macklin Gobrick & Toare
Attorneys Patented Dec. 25, 1928.

1,696,179

UNITED STATES PATENT OFFICE.

CHARLES E. F. AHLM, OF CLEVELAND, OHIO, ASSIGNOR TO AUTOMOTIVE PATENT HOLDING COMPANY, OF CLEVELAND, OHIO, A CORPORATION OF DELAWARE.

GEAR AND CLUTCH MECHANISM.

Original application filed March 14, 1925, Serial No. 15,480. Divided and this application filed February 21, 1927. Serial No. 169,728.

This invention relates to dental clutches and the object is to provide a simple and easily manufactured clutch device for connecting and disconnecting aligned members such as a pair of shafts.

A more specific object is to provide a dental clutch sleeve and cooperating clutch elements which may be easily formed by known manufacturing methods to provide in effect a staggered relation between the engaging ends of teeth on the sleeve and teeth on the element or elements to be engaged thereby.

To provide cooperating sets of staggered teeth in gears and clutches is known to the prior art. The particular improvement herein claimed relates to a more simplified and more economically manufactured form of dental clutch coupling, having the advantage over the ordinary dental clutch of being easily operated as in changing the speed relations between the driving and driven members of a transmission gearing. A further advantage of my arrangement is that it considerably facilitates the assembly of the clutch into a mechanism such as a transmission gearing.

In carrying out the invention, I use a clutch sleeve having two longitudinally spaced sets of internal teeth substantially identical in contour and formed on equal diameters. One set engages external teeth of one of the rotatable elements to be connected as a spline, and the other set engages and disengages external teeth on another element. The teeth of each set of internals preferably have the same length measured parallel to the axis of the sleeve, wherefore either set may serve as an element of the spline connection, and either set as the engaging and disengaging element. A further refinement is to locate the shipper fork engaging groove midway between the sets of internanl teeth so that the plane of this groove is unchanged when the sleeve is turned end for end.

The external teeth, which one set of internals engage and disengage, are long and short in effect; that is to say, some of the external teeth of a given set extend longitudinally past others of the same set. The cooperating internal teeth on the sleeve have this effect of staggered teeth, so far as relates to easy engagement at considerable relative speed, by reason of the fact that the internal teeth are spaced apart circumferentially wider than the external teeth with which they are to engage. The above results in that no expensive milling operation has to be performed in making the sleeve, such as milling off the ends of some of the teeth, as is necessary with the externals, in order to obtain the staggered tooth effect.

One use of my invention is illustrated in my co-pending application, Serial No. 15,480 filed March 14th, 1925, of which the present application is a division. In the drawings Fig. 1 is a fragmentary central longitudinal sectional view showing some of the parts of a one speed change transmission gearing such as shown in my said prior application, the clutch and portions of the gears being shown; Fig. 2 is a fragmentary view of two cooperating clutch elements embodying my invention, portions of each element being broken away for clearness of illustration; Fig. 3 is a fragmentary transverse sectional view through the cooperating clutch elements as indicated by the line 3—3 on Fig. 1.

Referring in detail to the drawing, 1 indicates a gearing casing in which is mounted a driving shaft 2 and a driven shaft 3, the driving shaft having suitable connections (not shown) to an engine shaft and the the driven shaft being adapted for connection to the propeller shaft of an automobile. Such a gearing is suitable for affording a single extra speed for each speed delivered by a main transmission positioned between the shaft 2 and the engine. The gearing may comprise external gear teeth P on the shaft 2 meshing with internal teeth $P^1$ on an eccentrically positioned compound gear 5, this gear having external teeth $P^2$ meshing with internal teeth $P^3$ on a hollow gear 6 surrounding the shaft 2 and suitably supported in bearings 7.

The clutch mechanism forming the subject of this invention is arranged to connect the shaft 3 selectively to the shaft 2 and gear member 6. To this end an enlargement of the member 3 is provided with external spline teeth at 10, permanently engaging internal spline teeth 11 on one end of the sleeve clutch member 12. The sleeve has internal teeth 13 at the other end, arranged to engage external teeth 15 rigid with the shaft 2 and similarly formed external teeth 17 rigid with the gear member 6. When the sleeve is in the position shown in Fig. 1 direct drive relation is obtained between shafts 2 and 3 through the sleeve 12 and when the sleeve is shifted to its forward position, bringing the teeth 13 into engagement with the teeth 17 on the gear, the shaft 3 is driven from the shaft 2 at a reduced speed through the gearing P—P¹—P²—P³.

The external teeth 15 and 17 are uniformly spaced like the teeth of a gear and the two sets are longitudinally separated as shown in Fig. 1, to provide a neutral position for the teeth 13, that is to say, to provide for entirely disconnecting one shaft from the other. The teeth 15 and 17 are alternately long and short as shown in Fig. 2, the teeth 17ª extending further toward the teeth 15 than the teeth 17ᵇ. I use the expression "long and short" simply for convenience to designate the staggered relation of the engaging ends of the teeth. This long and short tooth effect may be easily obtained with reference to external teeth by well known milling operations. As shown every other tooth is long and the intermediate teeth short. The effect of staggered teeth is had with reference to the internal teeth 13, without having to end mill some of the teeth which would be very difficult, particularly at the inner ends of the teeth such as 13, by reason of the fact that every other tooth space is simply left vacant. By providing one internal tooth for each pair of external teeth each internal tooth is supported at both sides when in full engagement by such pair as shown in Fig. 3, yet when the internal and external teeth are brought together the engagement is rendered easy irrespective of considerable relative speed by reason of the fact that the teeth 13 may enter the comparatively wide space between the adjacent longer teeth, 17ª for example, and after the relative rotation of the members such as 3 and 6 has brought the teeth 13 against the longer teeth the sleeve may then be slid with practically no effort into full engagement. Suitable means for sliding the sleeve consists in the provision of rings 20 forming in effect a groove, engageable by a shifting fork 21 on a sliding carriage 22 which may be shifted from one position to another by a pivoted lever 25 or other suitable control. This groove is preferably midway between the teeth 11 and 13 wherefore, assuming the teeth are the same length, as shown, the sleeve may be used with either set, 11 or 13, serving as the spline element and either set to selectively pick up the external teeth 15 and 17.

A further feature of my invention consists in that the teeth on both ends of the sleeve, namely the teeth 11 and 13 may be formed at the same time by easy broaching or milling operations. The teeth 11 are the same distance apart as the teeth 13 and on the same pitch diameter. The spline teeth 10 on the shaft 3 being of the same profile and spacing as the teeth 15 and 17, this provides the same tooth relation as illustrated in Fig. 3 to prevent relative movement in either direction between the sleeve and shaft 3.

I claim:

1. In a device of the character described, in combination two externally toothed members and a sleeve having two longitudinally separated sets of internal teeth of substantially identical contour and formed on equal pitch diameters, certain of the external teeth of each set extending longitudinally past others of the same set, each set of internal teeth on the sleeve being spaced circumferentially at least twice the distance of the external teeth, and a power transmitting member adapted to slidably engage one set of internal teeth as a spline, whereby such power transmitting member may be selectively connected with the externally toothed members through the other set of internal teeth.

2. A coupling device comprising in combination three concentric power transmitting elements, each having a set of external teeth formed on the same pitch diameter, and a clutch sleeve having two longitudinally separated sets of internal teeth substantially identical in contour and formed on the same pitch diameter, one internal set being adapted to engage one of the concentric elements as a spline, whereby this element may be selectively coupled to the other two by means of the other internal set, said sleeve having a groove adapted for engagement by a shipper fork, said groove being centrally located between the sets of internal teeth whereby the sleeve may be reversed end for end without changing the position of the plane of the groove with reference to the power transmitting elements.

3. In a dental clutch coupling for a plurality of concentric rotatable members, external teeth carried by each concentric member, one set comprising teeth of unequal longitudinal extent in a given direction providing in effect long and short teeth and a sleeve having two longitudinally separated sets of identically formed internal teeth on the same pitch diameters, said internal teeth of each set being spaced apart circumferentially wider than two adjacent external teeth of the rotatable members for engagement between adjacent teeth of respective external sets, said sleeve having a groove in a plane transverse to the axis of the sleeve and midway between the sets of internal teeth, said groove being adapted for engagement with a shipper fork.

In testimony whereof, I hereunto affix my signature.

CHARLES E. F. AHLM.